(12) United States Patent
Hasuda

(10) Patent No.: US 8,408,822 B2
(45) Date of Patent: Apr. 2, 2013

(54) CAMERA

(75) Inventor: Masanori Hasuda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 442 days.

(21) Appl. No.: 12/314,524

(22) Filed: Dec. 11, 2008

(65) Prior Publication Data

US 2009/0154915 A1 Jun. 18, 2009

(30) Foreign Application Priority Data

| Dec. 12, 2007 | (JP) | 2007-320842 |
| Dec. 12, 2007 | (JP) | 2007-320894 |
| Aug. 12, 2008 | (JP) | 2008-207971 |

(51) Int. Cl.
*G03B 17/00* (2006.01)

(52) U.S. Cl. .................. 396/448; 396/529

(58) Field of Classification Search .......... 396/448, 396/529–533, 535; 348/360

See application file for complete search history.

(56) References Cited

U.S. PATENT DOCUMENTS

| 6,088,535 | A * | 7/2000 | Katano et al. .......... 396/72 |
| 6,164,842 | A * | 12/2000 | Ohta et al. ............ 396/349 |
| 6,742,943 | B2 | 6/2004 | Ushiro |
| 7,843,507 | B2 | 11/2010 | Yuyama |
| 2003/0174229 | A1 * | 9/2003 | Kubota .................. 348/335 |
| 2004/0169761 | A1 * | 9/2004 | Kawai et al. ........... 348/335 |
| 2006/0088314 | A1 * | 4/2006 | Matsushita et al. ..... 396/529 |
| 2008/0002968 | A1 * | 1/2008 | Arai ..................... 396/448 |

FOREIGN PATENT DOCUMENTS

| JP | 08-110464 | 4/1996 |
| JP | 11-295797 | 10/1999 |
| JP | 2004-109970 | 4/2004 |
| JP | 3550602 | 5/2004 |
| JP | 2005-176015 | 6/2005 |
| JP | 2005-181456 | 7/2005 |
| JP | 2007-166041 | 6/2007 |
| JP | 2007-183483 | 7/2007 |
| JP | 2007-288530 | 11/2007 |

OTHER PUBLICATIONS

Japanese Office Action for corresponding Japanese Application 2007-320842; mailed May 15, 2012.
Japanese Notice of Reasons for Rejection issued to Japanese Application 2008-207971; mailed Sep. 25, 2012.

* cited by examiner

*Primary Examiner* — Clayton E LaBalle
*Assistant Examiner* — Noam Reisner

(57) ABSTRACT

A camera capable of closing a barrier in accordance with need, even an interchangeable lens is mounted. The camera is provided with a connection portion, a barrier member and a barrier control section. The connection portion is detachably connected with the interchangeable lens and is provided with an aperture portion, which allows object light to pass therethrough. The barrier member is movably provided, in the state the interchangeable lens is connected with the connection portion, between a closed position, the barrier member closes off the aperture portion of the connection portion, and an open position, the barrier member is withdrawn from the light path. The barrier control section judges a state of mounting of the interchangeable lens to the connection portion, controls the barrier member to the closed position if the interchangeable lens is not mounted, and to the open position if mounted and a predetermined first condition is satisfied.

22 Claims, 10 Drawing Sheets

CAMERA

The disclosure of the following priority application is herein incorporated by references: Japanese Patent Application No. 2007-320842 filed on Dec. 12, 2007, No. 2007-320894 filed on Dec. 12, 2007, and No. 2008-207971 filed on Aug. 12, 2008.

BACKGROUND OF THE INVENTION

1. Field of the Invention

The present invention relates to a camera.

2. Description of the Related art

Heretofore, lens-interchangeable type cameras provided with a barrier that, in a state in which an interchangeable lens is not attached, closes off an aperture that is provided in a casing for allowing the passage of object light has been known (see, for example, Japanese Unexamined Patent Publication No. 2004-109970).

SUMMARY OF THE INVENTION

In the camera described in the above Reference, the barrier is opened/closed in accordance with operations of mounting of the interchangeable lens. However, even when the interchangeable lens is mounted, there are cases in which it is desirable to close the barrier, for reasons such as the protection of an imaging unit and the like. An object of the present invention is to provide a camera in which closing a barrier is possible in accordance with need, even in a state in which an interchangeable lens is mounted.

Further, in the camera described in the above-mentioned Reference, there is a possibility of an optical axis direction dimension (thickness of the camera) being increased by the provision of the barrier apparatus. In recent years, there have been trends for cameras to get smaller and thinner, and further reductions in size and thickness are desired even for cameras provided with barrier apparatuses. A further object of the present invention is to provide a camera that is reduced in size.

In order to achieve the object mentioned above, according to a first aspect of the present invention, there is provided: a camera comprising: a connection portion that is detachably connected with an interchangeable lens and is provided with an aperture portion, the aperture portion allowing object light that advances through the interchangeable lens to pass therethrough; a barrier member that is provided to be movable, in a state in which the interchangeable lens is connected with the connection portion, between a closed position, at which the barrier member substantially closes off the aperture portion of the connection portion, and an open position, at which the barrier member is withdrawn from a light path of the object light; and a barrier control section that judges a state of mounting of the interchangeable lens to the connection portion, controls the barrier member to the closed position if the interchangeable lens is not mounted, and controls the barrier member to the open position if the interchangeable lens is mounted and a predetermined first condition is satisfied.

In the first aspect of the present invention, the barrier control section may judge that the first condition is not satisfied if a power supply of the camera is in an off state, and may judge that the first condition is satisfied if the power supply is in an on state and at least one of predetermined second conditions is satisfied.

The camera may comprise a power supply control section that, under a defined condition, implements power consumption reduction control which suspends supplies of electrical power to at least a portion of electrical members provided in the camera, wherein the barrier control section may judge that the second condition is satisfied if the power supply control section is not performing the power consumption reduction control.

Even if the power supply control section has commenced the power consumption reduction control, the barrier control section may consider the second condition to be satisfied until a predetermined duration has passed since the power consumption reduction control being commenced.

The camera may further comprise a photometry section that measures a brightness of an object field, wherein the barrier control section may judge that the second condition is satisfied if a photometry value provided by the photometry section is less than a predetermined threshold value.

If the photometry value is at least the threshold value, the barrier control section may control to close the barrier member regardless of whether or not the second condition is satisfied.

The camera may be provided with a dark light exposure control mode that performs automatic exposure control appropriate to imaging in a dark place as an automatic exposure control mode and the barrier control section may judge that the second condition is satisfied if the dark light exposure control mode is selected.

The barrier control section variably may control a movement speed of the barrier member in accordance with a condition.

The camera may be provided with a quiet mode that reduces operation sounds and, when the quiet mode is selected, the barrier control section may perform control to make a driving speed of the barrier member slower than when another mode is selected.

The barrier control section may control the barrier member to the closed position if the interchangeable lens is mounted and the first condition is not satisfied.

The interchangeable lens may be provided with a plurality of lens units, and may be capable of being either in a first state, in which the plurality of lens units can be disposed to be capable of focusing an image at an imaging surface of the camera, or a second state, in which a lens length is shorter than in the first state and the plurality of lens units cannot be disposed to be capable of focusing the image at the lens imaging surface, and the barrier control section may control the barrier member to the closed position if the interchangeable lens is in the second state.

The camera may be set to any of a imaging mode, which performs imaging, and a non-imaging mode, which performs an operation other than imaging, and the barrier control section may control the barrier member to the closed position if the camera is in the non-photography mode.

The barrier control section may control the barrier member to the closed position if an interchange operation of the interchangeable lens is being performed.

The barrier member may be provided to be movable, between the closed position that substantially closes off the aperture portion and the open position that is withdrawn from the light path of the object light, within a plane substantially perpendicular to an optical axis of the object light passing through the aperture portion, and the camera may provided with: a body side electrical contact point that is provided to be capable, in the state in which the interchangeable lens is connected with the connection portion, of contact with a lens side electrical contact point provided at the interchangeable lens; and a contact support portion which is a member that supports the body side electrical contact point, and at least a portion of the contact support portion, in the optical-axis direction, overlapped with the plane substantially perpendicular to the optical axis that defines movement of the barrier member.

The contact support portion may be disposed at a position that avoids a range of movement when the barrier member moves between the closed position and the open position.

The camera may further comprising: an imaging unit that includes an imaging element which converts the signal light to electronic signals, wherein the barrier member, at the closed position, may be disposed to oppose an incidence face of the imaging unit, and in the state of opposition of the barrier member at the closed position and the imaging unit, no other member may be disposed between the barrier member and the imaging unit.

The imaging unit may be provided with an optical filter that is disposed to oppose an imaging surface of the imaging element, and the barrier member, at the closed position, may be disposed to oppose the optical filter.

The camera may further comprising: an imaging unit that includes an imaging element, which converts signal light that has passed through the interchangeable lens to electronic signals, and a light-transmissive member capable of vibrating, which is disposed at an incidence face side of the imaging unit, wherein the barrier member, at the closed position, may be disposed to oppose the light-transmissive member, and in the state of opposition of the barrier member at the closed position and the light-transmissive member, no other member may be disposed between the barrier member and the light-transmissive member.

According to a second aspect of the present invention, there is provided: a camera comprising: a connection portion that is detachably connected with an interchangeable lens and is provided with an aperture portion, the aperture portion allowing object light that advances through the interchangeable lens to pass therethrough; a barrier member that is provided to be movable, within a plane substantially perpendicular to an optical axis of the object light passing through the aperture portion, between a closed position, at which the barrier member substantially closes off the aperture portion, and an open position, at which the barrier member is withdrawn from a light path of the object light; a body side electrical contact point that is provided to be capable, in the state in which the interchangeable lens is connected with the connection portion, of contact with a lens side electrical contact point provided at the interchangeable lens; and a contact support portion which is a member that supports the body side electrical contact point, and at least a portion of the contact support portion, in the optical axis direction, overlapped with the plane substantially perpendicular to the optical axis that defines movement of the barrier member.

In the second aspect of the present invention, the contact support portion may be disposed at a position that avoids a range of movement when the barrier member moves between the closed position and the open position.

The constitutions described hereabove may be suitably modified, and at least portions thereof may be substituted with other constituents.

According to the present invention, a camera can be provided in which closing a barrier is possible in accordance with need, even in a state in which an interchangeable lens is mounted. Further, a camera that is reduced in size can be provided.

DETAILED DESCRIPTION OF THE PREFERRED EMBODIMENTS

First Embodiment

Herebelow, an embodiment of a camera to which the present invention is applied is described with reference to the drawings and the like.

Figure 1A:
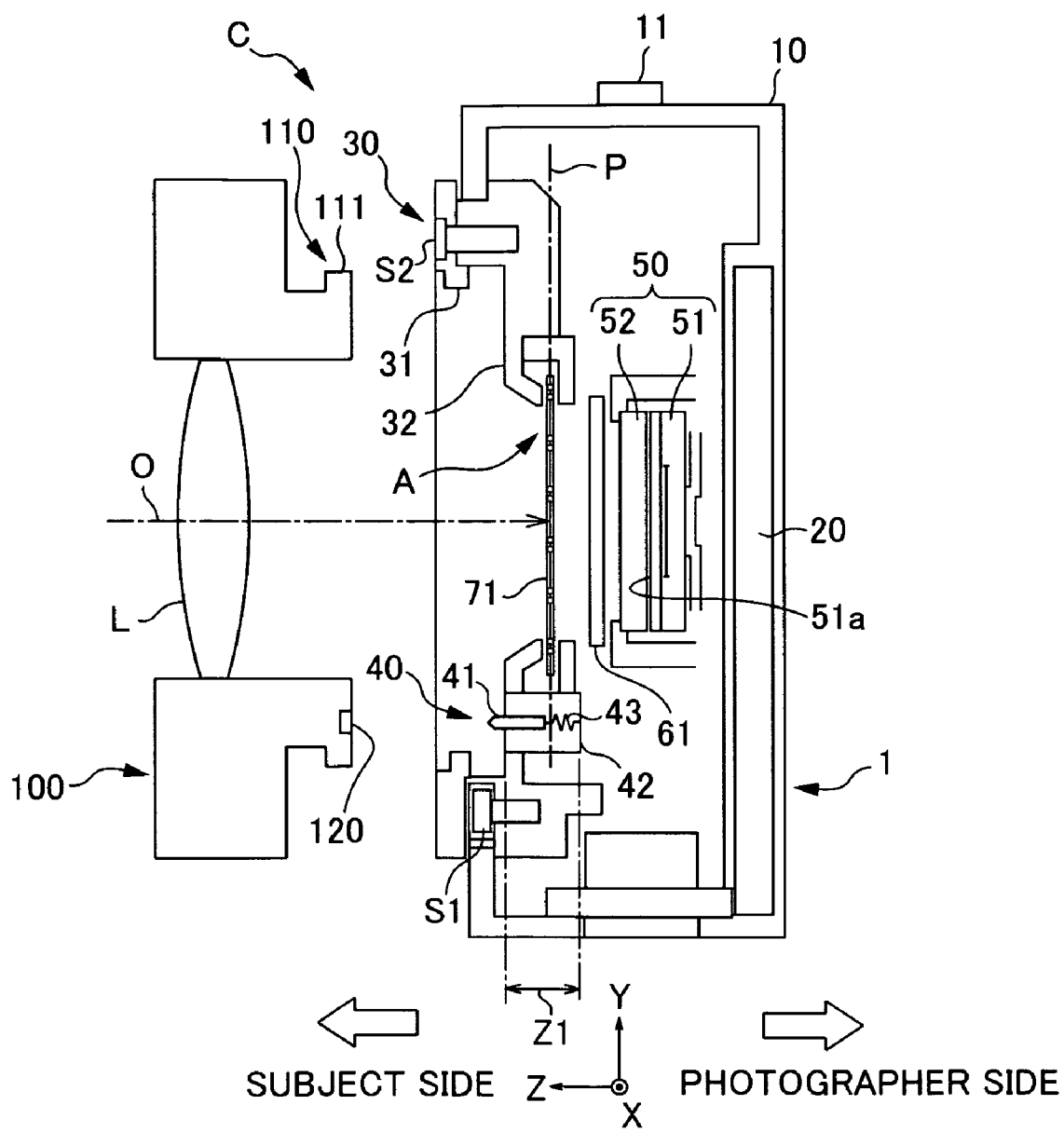
FIG. 1A and FIG. 1B are sectional diagrams showing the constitution of a camera of a first embodiment.
Figure 1B:
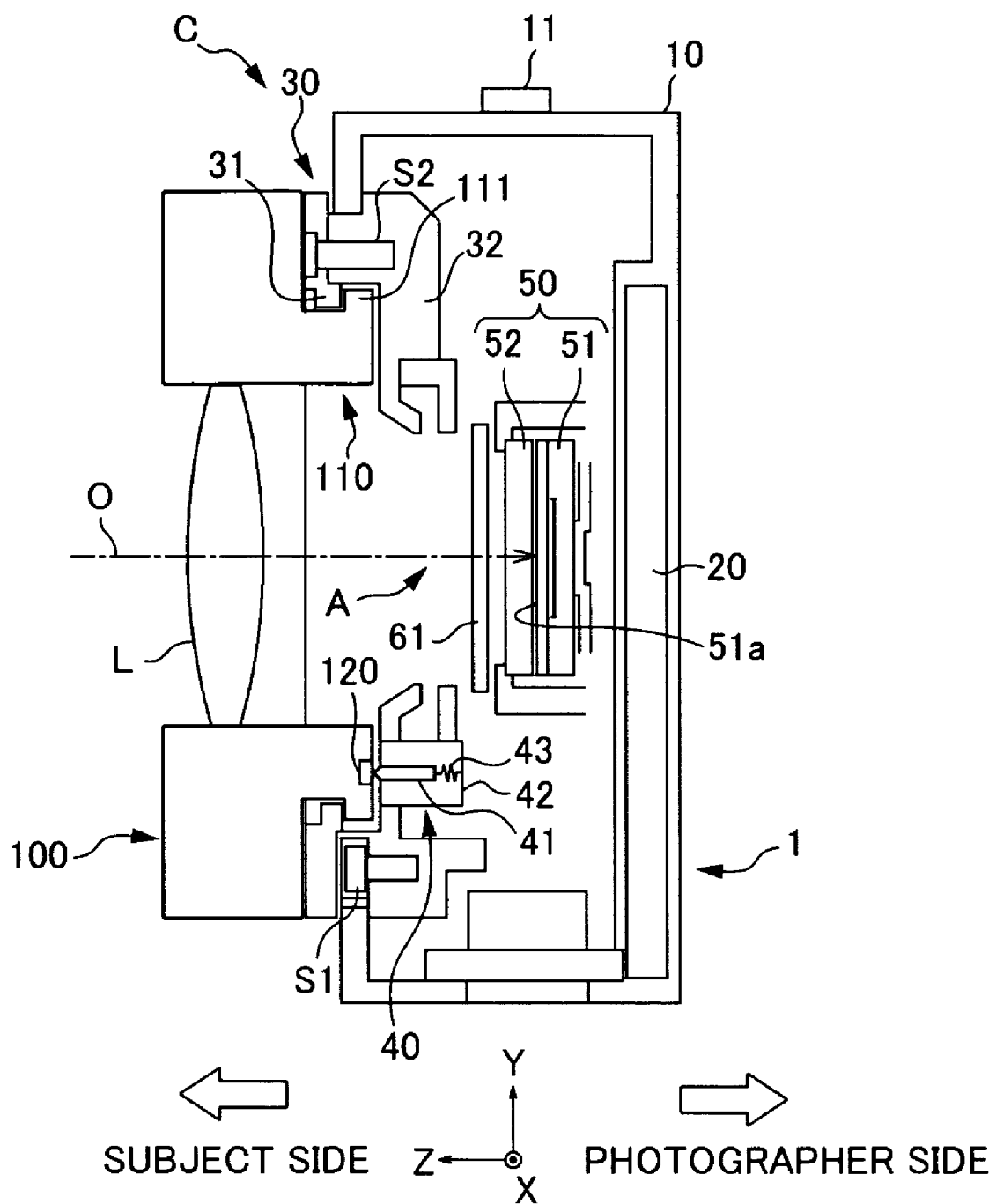

FIG. 1A and FIG. 1B are sectional diagrams showing the constitution of the camera of the embodiment.

FIG. 1A and FIG. 1B show, respectively, a state in which a later-described barrier 71 is at a closed position and a state in which the barrier 71 is at an open position.

Furthermore, FIG. 1A shows a state before an interchangeable lens 100 is mounted to a camera 1, and FIG. 1B shows a state in which the interchangeable lens 100 is mounted to the camera 1.

Figure 2:
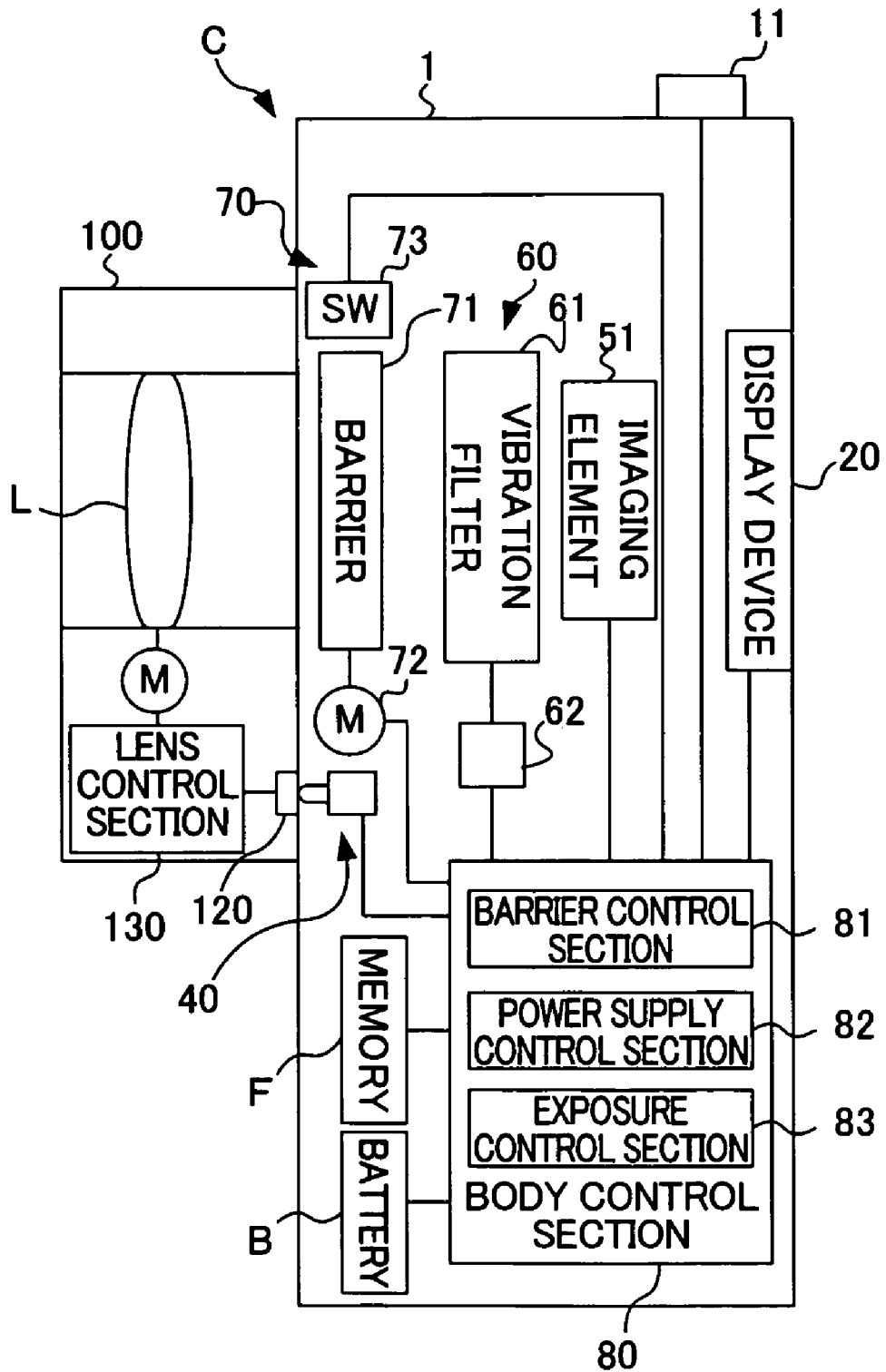
FIG. 2 is a block diagram showing the constitution of the camera shown in FIG. 1A and FIG. 1B.

FIG. 2 is a block diagram showing the constitution of the camera shown in FIG. 1A and FIG. 1B.

Hereinafter, in order to facilitate understanding, the drawings, including FIG. 1A and FIG. 1B, are described with a three-dimensional coordinate system based on suitable X-Y-Z axes being specified.

The camera 1 is a camera body that, operating in cooperation with the interchangeable lens 100, forms a lens-interchangeable type digital camera system C.

The interchangeable lens 100 is provided with a imaging lens L that guides object light to a later-described imaging element 51, a lens side mount 110 that is connected with a body side mount 30 provided at the camera 1, lens side electrical contact points 120 that make contact with body side electrical contact points 41 which are provided at the camera 1, a lens control section 130 (see FIG. 2) that performs overall control of the elements provided in the interchangeable lens 100, and so forth.

The imaging lens L includes a plurality of unillustrated lens units, and is provided with an actuator such as, for example, an electric motor M or the like (see FIG. 2), which drives these lens units in the directions of an optical axis O. The interchangeable lens 100 implements a change in imaging angle or a focusing operation with respect to an object by suitably advancing or retreating these lens groups along with the optical axis O direction.

The lens side mount 110 is provided at a mounting direction distal end portion of the interchangeable lens 100, and the lens side electrical contact points 120 are provided at the lens side mount 110.

An unillustrated plurality of types of interchangeable lens, which are provided with mounts in common with the lens side mount 110, are prepared for the camera 1 of the present embodiment. These interchangeable lenses may be selectively mounted at the camera 1 in place of the interchangeable lens 100 shown in FIG. 1A and FIG. 1B.

Herein, the body side mount 30 and the lens side mount 110 have a publicly known bayonet-type mounting structure, but the mounting structure is not limited thus and other publicly known structures may be constituted.

Next, the camera 1 is described.

The camera 1 is provided with a casing 10, a display device 20, the body side mount 30, an electrical contact portion 40, an imaging unit 50, a dust removal apparatus 60, a barrier apparatus 70, a body control section 80 and so forth. (See FIG. 2 for the dust removal apparatus 60, the barrier apparatus 70 and the body control section 80.)

The casing 10 is a box body formed of, for example, a synthetic resin material, a metallic material or the like. The casing 10 is formed as a substantial cubed with a thickness direction (Z-axis direction) dimension being smaller than both of a width direction (X-axis direction) dimension and a height direction (Y-axis direction) dimension.

Various operation switches and the like, such as, for example, a release button 11, an unillustrated power switch and the like, are provided at exterior surfaces of the casing 10.

The release button 11 is a push-button switch which can be pressed in two stages—a full-press operation and a half-press operation. For example, in response to a full-press operation of the release button 11, the camera 1 commences a imaging operation, and in response to a half-press operation of the release button 11, the camera 1 commences an autofocus (AF) operation.

An unillustrated battery chamber and a slot portion are provided inside the casing 10. The battery chamber accommodates a battery B that supplies power to electrical members provided in the camera 1, and the slot portion accommodates a recording medium, such as a flash memory or the like, that records image data and the like. (The battery chamber and the slot portion are not shown in the drawings.) The battery B and a flash memory F are detachably installed in the camera 1.

Hereinafter, in the embodiment of the camera 1, two face portions that are orthogonal to the thickness direction (Z-axis direction) of the casing 10 are referred to as a front face portion and a rear face portion, respectively. Further, in the present specification, descriptions are given with an attitude of the camera 1 as shown in FIG. 1A and FIG. 1B, in which the front face portion and rear face portion of the camera 1 are made substantially parallel to the vertical plane (the X-Y plane) and a horizontally-long format image is being photographed, being referred to as a usual position of the camera 1. In the usual position, the rear face portion of the camera 1 faces a photographer, and the front face portion is oriented toward an object. In the present specification hereinafter, descriptions relating to positions of elements included in the camera 1 are given by reference to the usual position of the camera 1.

The display device 20 includes, for example, a liquid crystal panel or the like that is disposed such that a display screen is exposed at the rear face portion of the casing 10. The display device 20 is capable of displaying photographed images, menu screens for implementing various settings, and so forth.

The present embodiment of the camera 1 is also provided with a live-view function that, during imaging, displays a through-image at the display device 20 substantially in real time. The through-image is generated on the basis of electronic signals outputted from the imaging element 51, which will be described later. A photographer can carry out framing while checking this through-image, and thus the display device 20 functions as a viewfinder device.

The body side mount 30 is a connection portion to which the interchangeable lens 100 is detachably connected, and is provided at the front face portion of the casing 10.

The body side mount 30 is provided with a raised portion 31, and a raised portion 111 is provided at the lens side mount 110 of the interchangeable lens 100. The raised portion 31 mechanically engages with the raised portion 111 in the state in which the interchangeable lens 100 is mounted at the camera 1.

The body side mount 30 is further provided with an aperture definition portion 32 that defines an aperture portion A, which is for allowing object light to pass therethrough. The aperture definition portion 32 is fixed to the casing 10 by a screw S1, and the raised portion 31 is fixed to the aperture definition portion 32 by a screw S2.

The aperture portion A of the present embodiment is formed in a circular shape, but is not limited thus and may be, for example, a rectangular shape.

The electrical contact portion 40 operates cooperatively with the lens side electrical contact points 120 of the interchangeable lens 100 and electrically connects the camera 1 with the interchangeable lens 100.

The camera 1 supplies electric power to the interchangeable lens 100 via the electrical contact portion 40 and the lens side electrical contact points 120. The body control section 80, which is described later, exchanges electronic signals with the lens control section 130 provided at the interchangeable lens 100, via the electrical contact portion 40 and the lens side electrical contact points 120 (see FIG. 2).

As shown in FIG. 1, the electrical contact portion 40 is provided with the aforementioned body side electrical contact points 41, which make contact with the lens side electrical contact points 120 of the interchangeable lens 100 in the state in which the interchangeable lens 100 is mounted, and a contact support portion 42, which is a member that supports the body side electrical contact points 41.

The body side electrical contact points 41 are pin-form movable contact points which are urged toward the object side in the optical axis O direction by springs 43 provided at the contact support portion 42. The body side electrical contact points 41 are provided to protrude from the contact support portion 42 toward the object side in the optical axis O direction in the state in which the interchangeable lens 100 is not mounted, (see FIG. 1A).

When the interchangeable lens 100 is mounted, the body side electrical contact points 41 are pushed by the lens side electrical contact points 120 provided at the interchangeable lens 100, and are thus moved toward the photographer side in the optical axis O direction while maintaining a state of contact with the lens side electrical contact points 120, and are pushed into the contact support portion 42 (see FIG. 1B).

The body side electrical contact points 41 are plurally provided (see FIG. 3). The plurality of body side electrical contact points 41 are disposed along and adjacent to a peripheral edge portion of the aperture portion A.

The imaging unit 50 is provided with the imaging element 51 which, when exposed to object light that advances through the interchangeable lens 100, converts the object light to electronic signals and outputs the same, and with an optical low pass filter 52 (LPF 52), which is disposed to oppose an incidence face of the imaging element 51. The LPF 52 is for preventing occurrences of moiré and suchlike in an object image that is focused onto an imaging surface 51a of the imaging element 51.

The camera 1 is formed such that the body control section 80 measures a brightness of the object light that passes through the imaging lens L (the object field brightness) on the basis of output from the imaging element 51 (i.e., performs photometry) and carries out automatic exposure control (AE control) on the basis of photometry results. Thus, the imaging element 51 functions as a photometry sensor (a photometry section).

Herein, the camera 1 is not provided with a mechanical shutter apparatus but performs adjustments of an exposure duration of object light at the imaging element 51 during imaging (a duration for which the imaging element 51 collects object light), by the later-described body control section 80 electronically controlling the imaging element 51 (electronic shutter control).

The dust removal apparatus 60 is for preventing impressions of dust in photographic images, when dust ingresses into the interior of the casing 10, when dust is generated from members disposed inside the casing 10, and the like. With respect to the optical axis O direction, the dust removal apparatus 60 is disposed at the object side relative to the LPF 52 provided at the imaging unit 50.

As shown in FIG. 2, the dust removal apparatus 60 is provided with a vibration filter 61 and a vibration generation device 62. The vibration filter 61 is formed of a material with light transmissivity. The vibration generation device 62 includes, for example, a piezoelectric device such as a piezo element or the like, and vibrates the vibration filter 61 with the piezoelectric device. The dust removal apparatus 60 shakes off, for example, dust adhering to the vibration filter 61 by causing the vibration filter 61 to vibrate, and thus prevents impressions of this dust in photographic images.

The barrier apparatus 70 is for preventing the ingression of dust into the interior of the casing 10, by closing off the aperture portion A formed in the above-described body side mount 30. The barrier apparatus 70 further functions as a shading member that, by closing off the aperture portion A, prevents the incidence of external light into the interior of the casing 10.

In the state shown in FIG. 1B in which the interchangeable lens 100 is mounted at the camera 1, with respect to the optical axis O direction, the barrier apparatus 70 is disposed at the photographer side relative to the raised portion 111 of the lens side mount 110. Therefore, even in the state in which the interchangeable lens is mounted at the camera 1, the barrier 71 can move between an open position and a closed position.

Figure 3A:
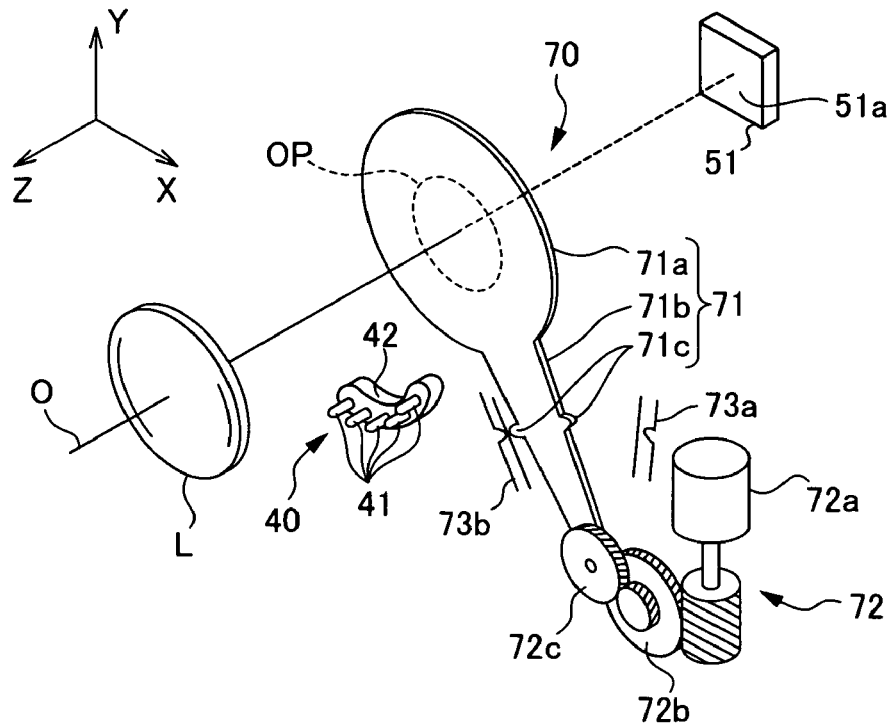
FIG. 3A and FIG. 3B are perspective diagrams showing the constitution of a barrier apparatus provided in the camera shown in FIG. 1A and FIG. 1B.
Figure 3B:
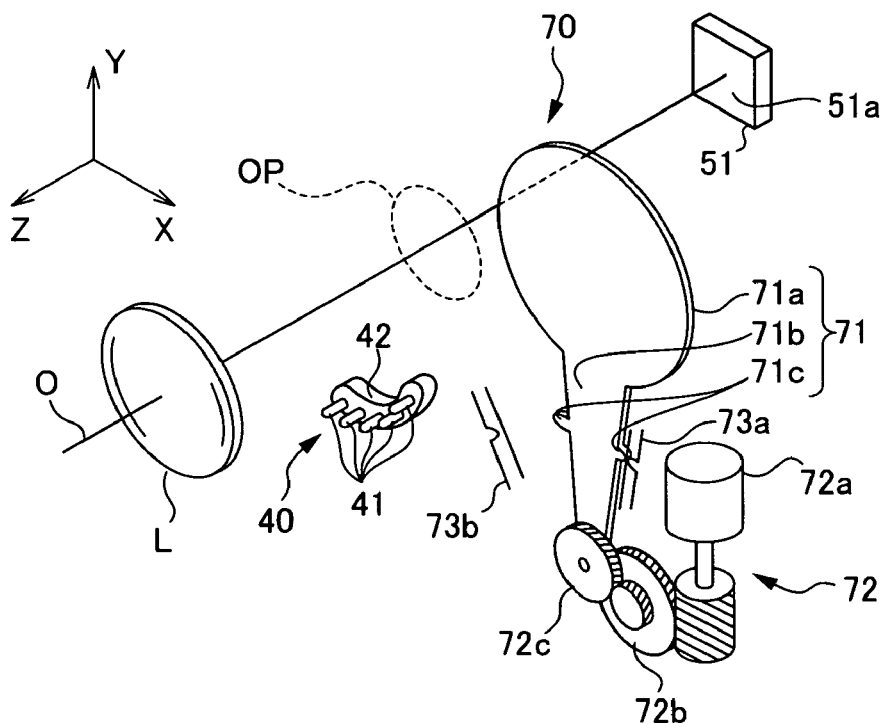

FIG. 3A and FIG. 3B are perspective diagrams showing the constitution of the barrier apparatus 70 provided in the camera.

Of these drawings, FIG. 3A shows a state in which the barrier 71 is at the closed position, substantially closing off the aperture portion A, and FIG. 3B shows a state in which the barrier 71 is at the open position, which is withdrawn from the light path OP of the object light.

As shown in FIG. 3A and FIG. 3B, the barrier apparatus 70 is provided with the barrier 71, a barrier driving section 72, an open/closed detection switch 73 (an open position detection switch 73a and a closed position detection switch 73b) and the like (see FIG. 2 for the open/closed detection switch 73).

The barrier 71 is provided with a barrier body portion 71a, which is formed in a circular disc shape, and an arm portion 71b, which is provided protruding radially outward relative to the barrier body portion 71a from a portion of an outer peripheral edge of the barrier body portion 71a.

When the barrier body portion 71a is at the closed position shown in FIG. 1A and FIG. 3A, the barrier body portion 71a is disposed on the light path OP of the object light, and blocks the object light that passes through the imaging lens L and advances toward the imaging element 51. On the other hand, when the barrier body portion 71a is at the open position shown in FIG. 1B and FIG. 3B, the barrier body portion 71a is withdrawn from the light path OP.

When the barrier 71 is moving between the open position and the closed position, the barrier 71 moves within a plane substantially perpendicular to the optical axis O (this plane is assigned the reference numeral P in FIG. 1A and FIG. 1B).

The barrier driving section 72 is a section that causes the barrier 71 to move between the open position and the closed position. The barrier driving section 72 is provided with an electric actuator 72a such as, for example, a DC motor or the like, and a reduction gear 72b that transmits output power of the electric actuator 72a to the barrier 71. A gear 72c, which meshes with the reduction gear 72b, is formed at a distal end portion of the arm portion 71b of the barrier 71.

The open/closed detection switch 73 is a detection device for detecting whether the barrier 71 is at the open position or is at the closed position, and is provided with the open position detection switch 73a and the closed position detection switch 73b. These switches are pressed by protrusions 71c, which are formed at the arm portion 71b, when the barrier 71 is at the open position or the closed position, respectively. Hence, the body control section 80 detects whether the barrier 71 is at the open position or the closed position.

Herein, the camera 1 is formed such that framing is carried out using the through-image displayed at the display device 20 as mentioned earlier. Accordingly, the camera 1 is not provided with a publicly known optical viewfinder apparatus constituted with a screen (a reticle) and a prism or the like, or a mirror unit for guiding object light to such an optical viewfinder apparatus.

Therefore, in the camera 1, when the barrier 71 is at the closed position, the barrier body portion 71a and the vibration filter 61 oppose one another without any other members being interposed therebetween (see FIG. 1A). Thus, because no other members are disposed between the barrier body portion 71a of the barrier 71 and the vibration filter 61 of the dust removal apparatus 60, a thickness direction (Z-axis direction) dimension of the camera 1 may be reduced, and the camera 1 may achieve a reduction in size and a reduction in thickness.

Next, the arrangement of the contact support portion 42 that supports the body side electrical contact points 41 is described.

The contact support portion 42 is fixed to the aperture definition portion 32. As shown in FIG. 3A and FIG. 3B, the contact support portion 42 is disposed at a position that avoids a range of movement when the barrier 71 is moving between the open position and the closed position (i.e., a position that allows opening and closing operations of the barrier 71).

The contact support portion 42 and the barrier apparatus 70 are both disposed at the photographer side in the optical axis O direction relative to the raised portion 111 of the interchangeable lens 100 in the mounted state. Therefore, even in the state in which the interchangeable lens 100 is mounted to the camera 1 and the lens side electrical contact points 120 and the body side electrical contact points 41 are in contact, the barrier 71 may perform movements between the open position and the closed position (opening/closing operations).

Now, it is necessary for the barrier apparatus 70 to be disposed in the vicinity of the aperture portion A formed in the body side mount 30, but it is also necessary for the contact support portion 42 that supports the body side electrical contact points 41 to be disposed in the vicinity of the aperture portion A. However, if the contact support portion 42 is disposed toward the object side or the photographer side relative to the barrier apparatus 70 in the optical axis O direction, then the thickness of the camera 1 will be increased. Moreover, if the contact support portion 42 is disposed toward the photographer side relative to the barrier apparatus 70 in the optical axis O direction, then opening and closing of the barrier 71 in the state in which the interchangeable lens 100 is mounted will be difficult.

However, in the present embodiment of the camera 1, the position in the optical axis O direction at which the contact support portion 42 is arranged (which is assigned the reference numeral Z1 in FIG. 1A) coincides (in the optical axis O direction) with the plane P substantially perpendicular to the optical axis O that defines movement of the barrier 71. Thus, the present embodiment of the camera 1 is structured with the body side electrical contact points 41 and the contact support portion 42 being disposed at positions that do not physically interfere with opening/closing operations of the barrier 71. Therefore, as described above, the thickness of the camera 1 is not increased even though it is possible to perform opening and closing of the barrier 71 even in the state in which the interchangeable lens 100 is mounted, and a reduction in size and a reduction in thickness may be achieved.

Moreover, even in the state in which the interchangeable lens 100 is mounted, the camera 1 can dispose the barrier 71 at the closed position. Therefore, even in the state in which the interchangeable lens 100 is mounted, the barrier 71 may be controlled to the closed position at non-imaging times and the like; for example, when a power supply is turned off, when the power supply is on but photographed images are being replayed at the display apparatus, and the like. In these cases, incidence of external light into the interior of the casing 10 may be prevented by the barrier 71, and damage to the imaging element 51 by the external light may be prevented.

Next, the body control section 80 shown in FIG. 2 is described. The body control section 80 is a section that performs overall control of the elements provided in the camera 1, and is provided with a processing unit such as a CPU or the like.

The body control section 80 is provided with a barrier control section 81, a power supply control section 82, an exposure control section 83, and so forth.

The barrier control section 81 is a section that implements opening/closing control of the barrier 71 in accordance with conditions. Furthermore, the barrier control section 81 controls the electric actuator 72a provided at the barrier driving section 72 so as to variably control a movement speed of the barrier 71.

The opening/closing control and the speed control of the barrier 71 that are implemented by the barrier control section 81 will be described in detail later.

The power supply control section 82 is a power supply circuit that controls power supply provision from the battery B to the electrical members provided in the camera 1. Under defined conditions, the power supply control section 82 implements power consumption reduction control, which suspends supplies of electrical power to at least a portion of the electrical members provided in the camera 1.

Below, control when the power consumption reduction control is being executed by the power supply control section 82 will be described.

It is usual for a user of the camera 1 to keep the power turned on even when not performing imaging, such that imaging can be performed promptly in response to a full-press operation of the release button 11. However, if the electrical members of the camera 1 are continuously left on standby, in a state capable of switching to imaging operations, it is possible that exhaustion of the battery B will be rapid.

Accordingly, the power supply control section 82 suspends supplies of power to some of the electrical members if no operation by the photographer is detected for a predetermined duration, which may be arbitrarily specified (for example, around 10 seconds), and thus the camera 1 realizes a reduction in power consumption. The electrical members that are object to the power consumption reduction control are not particularly limited; for example, the display device 20 can be mentioned. When the power supply control section 82 suspends the supply of power to the display device 20, the through-image is extinguished, and a reduction of power consumption is realized as a result.

The power consumption reduction control can be canceled by, for example, a photographer performing a half-press operation of the release button 11.

The exposure control section 83 is a section that adjusts exposure conditions in accordance with a imaging mode selected by a photographer and/or automatically in accordance with output from the imaging element 51.

In the present embodiment of the camera 1, as imaging modes that a photographer can specify, for example, a night scene imaging mode suitable for imaging of night scenes, a night time portrait mode suitable for photographing people with night scene backgrounds, and the like are prepared. Hereinafter, the imaging modes that are to be selected when photographing in dark places are referred to as a "dark light imaging mode". When the dark light imaging mode is selected, the exposure control section 83 carries out automatic exposure adjustments in a dark light exposure control mode, and suitably adjusts exposure conditions to be suitable for imaging in dark places.

Next, the opening/closing control and speed control of the barrier 71 that are carried out by the barrier control section 81 are described.

Figure 4:
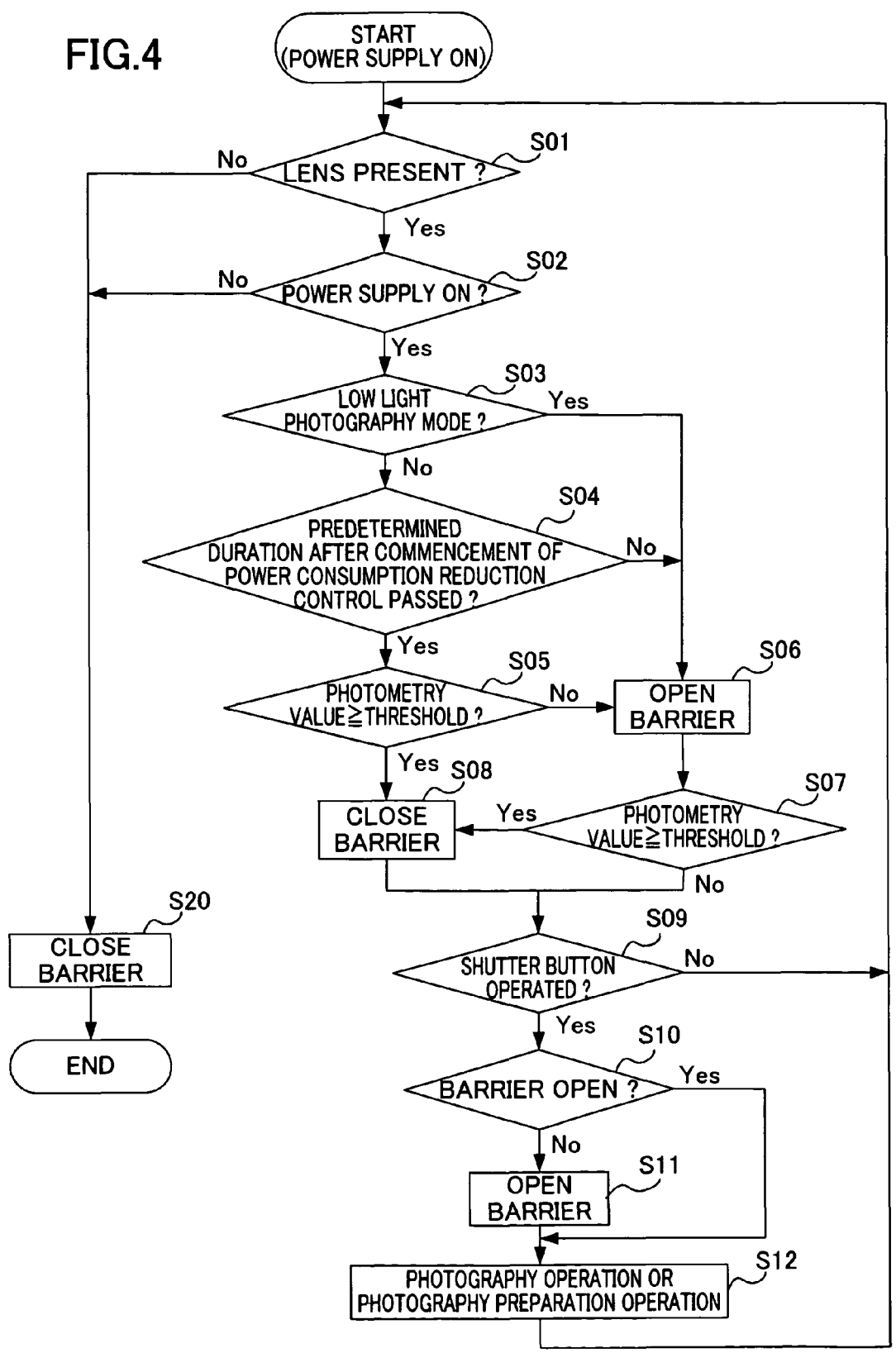
FIG. 4 is a flowchart showing opening/closing control of the barrier, which is implemented by a body control section provided in the camera shown in FIG. 2.

FIG. 4 is a flowchart showing opening/closing control of the barrier, which is implemented by the barrier control section provided in the camera shown in FIG. 2.

Herebelow, this is described step by step.

(Step S01: Interchangeable Lens Mounting Judgment)

The barrier control section 81 judges whether or not the interchangeable lens 100 is mounted to the camera 1 via the electrical contact portion 40. If the barrier control section 81 judges that the interchangeable lens 100 is mounted, the barrier control section 81 proceeds to step S02. Alternatively, if the barrier control section 81 judges that the interchangeable lens 100 is not mounted, it proceeds to step S20.

(Step S02: Power Supply Judgment)

The barrier control section 81 judges the on/off state of the power supply, which is a first condition, and if the power supply is on, proceeds to step S03. Alternatively, if the power supply is in the off state rather than the on state, the barrier control section 81 proceeds to step S20.

(Step S03: Imaging Mode Judgment)

The barrier control section 81 performs a judgment of whether the imaging mode is set to the dark light imaging mode, which is a second condition. If the barrier control section 81 judges that the imaging mode is set to a mode other than the dark light imaging mode, it proceeds to step S04, and if the barrier control section 81 judges that the imaging mode is set to the dark light imaging mode, it proceeds to step S06 and implements opening control of the barrier 71.

(Step S04: Power Consumption Reduction Control Judgment)

The barrier control section 81 performs a judgment of whether or not a predetermined duration has passed since the power supply control section 82 commencing the power consumption reduction control, which is a second condition. If the predetermined duration has passed since the power supply control section 82 commencing the power consumption reduction control, the barrier control section 81 proceeds to step S05.

Alternatively, if the power consumption reduction control is not being performed or the predetermined duration has not passed since the power consumption reduction control being commenced, the barrier control section 81 proceeds to step S06 and implements opening control of the barrier 71.

(Step S05: Comparison of Photometry Value with Threshold Value)

In the state in which the barrier 71 is at the open position, the body control section 80 performs light measurements based on outputs of the imaging element 51 at predetermined time intervals. The barrier control section 81 performs a judgment of whether or not a corresponding photometry value is higher than a threshold value (i.e., whether the object field is bright), which is a second condition. If the photometry value is lower than the threshold value (if it is dark), then even though the imaging mode is set to a mode other than the dark light imaging mode (the 'no' judgment in step S03) and the predetermined duration has passed since the power consumption reduction control being commenced (the 'yes' judgment in step S04), the barrier control section 81 proceeds to step S06 and implements opening control of the barrier 71.

Alternatively, if the photometry value is at or above the threshold value (if it is bright), the barrier control section 81 proceeds to step S08 and implements closing control of the barrier 71, protecting the imaging element 51 from external light. Here, if the barrier 71 is already at the closed position, then it is not possible to perform the photometry (because the photometry is performed with the imaging element 51 in the present embodiment), and the barrier control section 81 skips the judgment of step S05 and proceeds from step S04 to step S08.

(Step S06: Open Position Control of Barrier)

If the power supply is in the on state and the interchangeable lens 100 is mounted and the dark light imaging mode is selected, the barrier control section 81 controls the barrier 71 to the open position. This is because it is assumed that brightness of the object field is low (dark) when the dark light imaging mode is selected, and thus there is no need to be concerned about damage to the imaging element 51 by external light. For similar reasons, the barrier control section 81 also controls the barrier 71 to the open position if the photometry value is lower than the threshold value.

Even when the dark light imaging mode is not selected, if the power supply control section 82 is not implementing the power consumption reduction control or the predetermined duration has not passed since the power supply control section 82 commencing the power consumption reduction control, then the body control section 80 similarly controls the barrier 71 to the open position and puts the camera 1 into a imaging standby state in which prompt imaging is possible. If the barrier 71 starts at the open position, the barrier control section 81 skips step S06 and proceeds to step S07.

The barrier 71 is not controlled to drive to the closed position immediately when the power supply control section 82 commences the power consumption reduction control because, even when the power supply control section 82 has commenced the power consumption reduction control, the likelihood of imaging operations being started is high, until the predetermined duration has passed. If the barrier 71 were controlled to drive to the closed position at the same time as the commencement of the power consumption reduction control, opening and closing operations of the barrier 71 would be frequent, exhaustion of the battery B would be rapid, wear of the bearing supporting the barrier 71 would progress rapidly, and noise associated with opening/closing operations of the barrier 71 might impair agreeability of using the camera. It is preferable for a user of the camera 1 to be able to arbitrarily specify how long the open state of the barrier 71 is maintained after the power consumption reduction control is commenced.

(Step S07: Comparison of Photometry Value with Threshold Value)

Similarly to step S05, the barrier control section 81 performs a judgment of whether or not a photometry value is higher than the threshold value. If the photometry value is at or above the threshold value, then even if the dark light imaging mode is selected (the 'yes' judgment in step S03), or the power supply control section 82 is not implementing the power consumption reduction control or the predetermined duration has not passed since the power consumption reduction control being commenced (the 'no' judgment in step S04), the barrier control section 81 proceeds to step S08 and implements closing control of the barrier 71, protecting the imaging element 51 from external light.

Now, if the barrier 71 is automatically controlled to close each time an object with high brightness (for example, the sun, a lighting fixture or the like) enters the object field during framing, operability may be impaired. Therefore, it is preferable to execute this automatic control to close the barrier 71 only if the state in which the photometry value is at or above the threshold value continues for a predetermined duration.

When the barrier 71 has been controlled to close automatically by this control, the barrier 71 may be driven to the open position by, for example, a half-press operation of the release button 11.

Meanwhile, if the photometry value is less than the threshold value, the barrier 71 is kept in the open position state.

Herein, step S07 gives consideration to cases in which a user experiences inconvenience. Accordingly, a protective mode for protecting the imaging element 51 from high-brightness external light may be arbitrarily set to 'on' or 'off'. When this protective mode is on, a flow in which step S07 is executed (the same flow as in FIG. 4) is used, and when the protective mode is off, step S07 is not executed (i.e., a flow in which step S07 is excised from FIG. 4 is executed).

(Step S08: Closed Position Control of Barrier)

The barrier control section 81 controls the electric actuator 72a and controls to drive the barrier 71 to the closed position.

(Step S09: Detection of Release Operation)

The barrier control section 81 detects a half-press operation or a full-press operation of the release button 11 (hereinafter, these are collectively referred to as release operations), and if one of these release operations is detected, proceeds to step S10.

Alternatively, if the barrier control section 81 does not detect a release operation, the barrier control section 81 returns to step S01, regardless of the position of the barrier 71 (whether the barrier 71 is at the open position or at the closed position), and repeats the above processing.

(Step S10: Barrier Position Judgment)

The barrier control section 81 judges whether the barrier 71 is at the open position or at the closed position. If the barrier 71 is at the open position, the barrier control section 81 proceeds to step S12 and carries out an imaging operation or a imaging preparation operation, which will be described below. Alternatively, if the barrier 71 is at the closed position, the barrier control section 81 proceeds to step S11.

(Step S11: Barrier Open Position Control)

The barrier control section 81 controls the barrier 71 to the open position, proceeds to step S12 and carries out the below-described imaging operation or imaging preparation operation. After the operation(s) of step S12, the barrier control section 81 returns to step S01 and repeats the above processing. In processing subsequent to this second loop, as long as the power consumption reduction control is not commenced and the photometry values do not go above the threshold value, and the like, the barrier 71 stays in the open position. Therefore, continuous imaging may be performed.

(Step S12: Imaging Operations)

In addition to the above-mentioned opening control of the barrier 71, the body control section 80 carries out control in accordance with the release operation performed at step S09. That is, if a full-press operation of the release button 11 is performed at step S09, the body control section 80 carries out AF control and AE control and then controls the imaging element 51 and starts an imaging operation for photographing an object. Image data obtained by the imaging operation is recorded in the flash memory F.

Alternatively, if a half-press operation of the release button 11 is performed at step S09, corresponding control (imaging preparation operations) is carried out. For example, if the power supply control section 82 is implementing the power consumption reduction control at the time of the half-press operation of the release button 11, the power consumption reduction control is canceled and the through-image is displayed at the display device 20. Further, if the barrier 71 is at the open position at the time of the half-press operation of the release button 11, then when the through-image is displayed at the display device 20, for example, AF control and the like is carried out.

(Step S20: Barrier Member Closed Position Control)

If the barrier control section 81 judges that the interchangeable lens 100 is not mounted at the camera 1 (the 'no' judgment in step S01), the barrier 71 is controlled to drive to the closed position, in order to prevent ingression of dust into the interior of the casing 10, and the processing ends. Further, if the barrier control section 81 detects that the power supply is in the off state (the 'no' judgment in step S02), the barrier 71 is controlled to drive to the closed position, in order to block external light, and the processing ends.

Next, control when the barrier control section 81 varies the driving speed of the barrier 71 is described.

The camera 1 is provided with, as imaging modes, a sound mode that artificially emits a shutter sound when a full-press operation of the release button 11 is performed, and a quiet mode in which this artificial shutter sound is not emitted. Furthermore, the camera 1 is provided with, as an imaging mode, a quiet imaging mode in which camera operations are optimized (for example, lens driving speeds of focusing, zooming and the like are set to low speeds) for when performing imaging in situations in which the generation of sound is not preferable (for example, in places in which quiet is desired such as art galleries and the like, and when photographing sleeping babies and so forth).

When the above-described quiet mode or quiet imaging mode is selected, the barrier control section 81 controls the barrier driving section 72, to control a driving speed of the barrier 71 to be slower than in a case in which a mode other than the quiet mode or quiet imaging mode is selected (for example, the above-mentioned sound mode). This control may be implemented by, for example, altering a period of pulse signals that are sent to the electric actuator 72a of the barrier driving section 72, or the like.

To what extent the driving speed of the barrier 71 is slowed is arbitrary, but an extent capable of reducing, for example, a contact sound when the barrier 71 makes contact with the open/closed detection switch 73 and suchlike is preferable.

The quiet imaging mode is a mode in which the camera 1 is prohibited from emitting operation sounds, and is expected to be used in, for example, cases in which the object is an object or person that is sensitive to sound. When this quiet imaging mode is selected, the camera 1 automatically performs control to slow down the driving speed of the barrier 71, reducing contact sound between the barrier 71 and the open/closed detection switch 73, friction sound that is generated when gears mesh together and the like.

Hereabove, opening/closing operations of the barrier 71 are described for cases in which imaging is carried out by the camera 1. The camera 1 is also provided with a replay display function that displays replays of photographed images at the display device 20.

When the mode of use of the camera 1 is switched from an imaging mode to the replay display mode, the barrier control section 81 performs control to drive the barrier 71 to the closed position, protecting the imaging element 51 from external light.

According to the embodiment of the camera 1 described hereabove, the following effects can be provided.

(1) Because the barrier control section 81 implements opening/closing control of the barrier 71 automatically in accordance with the on/off state of the power supply, the mounting state of the interchangeable lens 100 and the like, the camera 1 has good usability.

(2) Because the camera 1 drives the barrier 71 to the closed position when the interchangeable lens 100 is not mounted, ingression of dust into the interior of the casing 10 can be prevented.

(3) Because the camera 1 judges the on/off state of the power supply and drives the barrier to the closed position when the power supply is off (when imaging is not being performed), damage to the imaging element 51 that is caused by external light reaching the imaging element 51 can be prevented.

(4) Because the camera 1 judges whether or not the power consumption reduction control is being implemented and drives the barrier 71 to the closed position if the power consumption reduction control is being implemented, similarly to when the power supply is off, the imaging element 51 can be protected from external light.

(5) Because, even when the power consumption reduction control is being implemented, the camera 1 does not perform opening/closing control of the barrier 71 until the predetermined duration has passed since the power consumption reduction control being commenced, excessive opening and closing movements of the barrier 71 can be prevented.

(6) Because the camera 1 judges whether or not the dark light imaging mode is selected and controls the barrier 71 to the open position if the dark light imaging mode is selected, excessive opening and closing movements of the barrier 71 can be prevented.

(7) Because the camera 1 judges whether or not a photometry value is at least the predetermined threshold value and controls the barrier 71 to the closed position if the photometry value is at or above the threshold value, damage to the imaging element 51 that is caused by external light can be prevented. Moreover, even when the dark light imaging mode is not selected, because the barrier 71 is not controlled to close when the photometry-value is below the threshold value, excessive opening and closing movements of the barrier 71 can be prevented.

(8) Because the camera 1 slows the movement speed of the barrier 71 when the quiet mode or quiet imaging mode or the like is selected, operation sounds emitted from the barrier 71 can be reduced.

Second Embodiment

Figure 5A:
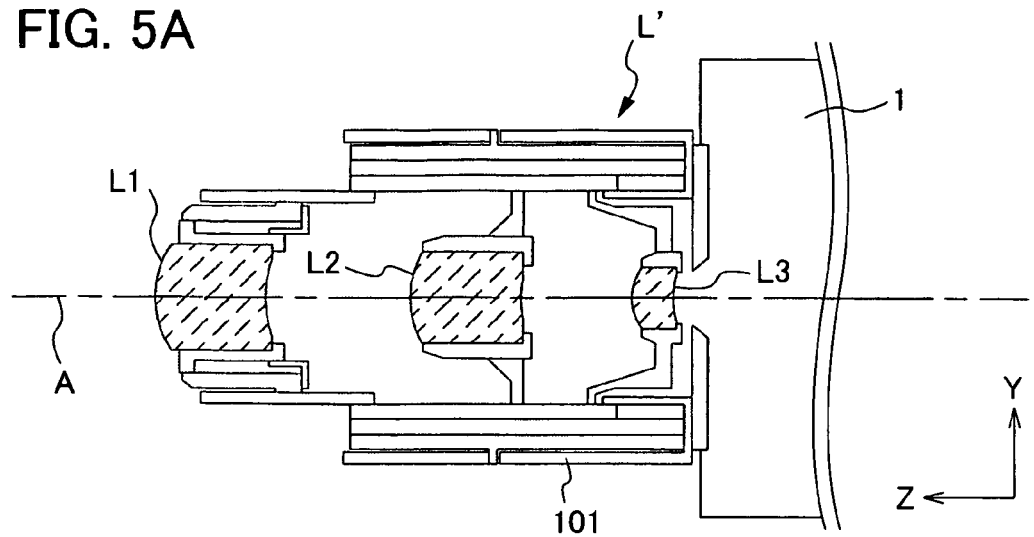
FIG. 5A, FIG. 5B and FIG. 5C are diagrams showing a imaging lens of a second embodiment.
Figure 5B:
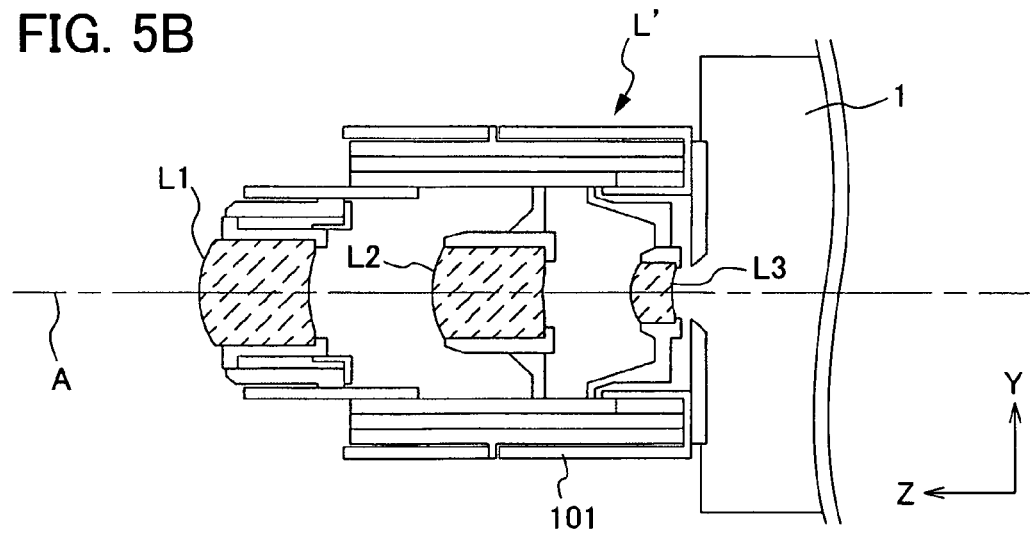
Figure 5C:
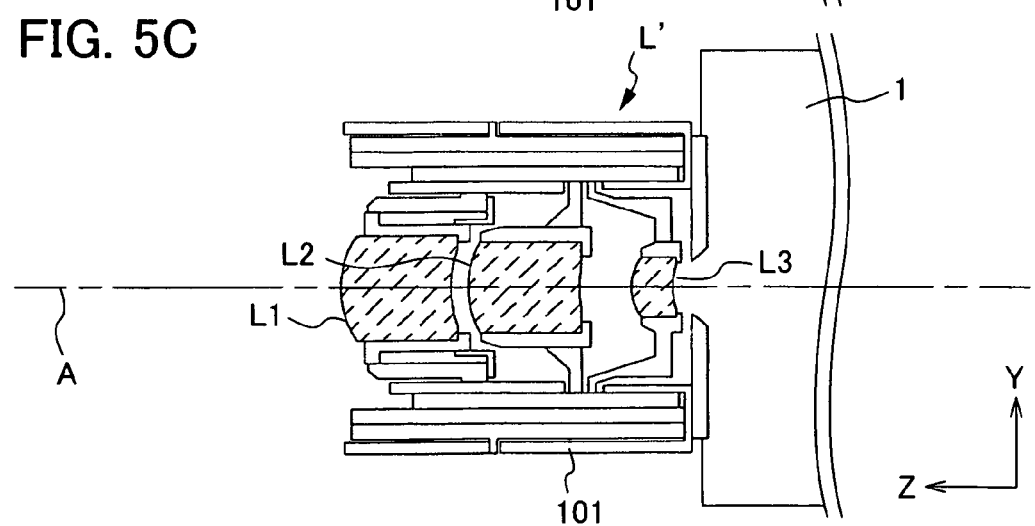

FIG. 5A, FIG. 5B and FIG. 5C are diagrams showing a imaging lens L' which is mounted at the camera 1 in the second embodiment. The imaging lens L' includes a zoom rotating barrel 101 which can be operated by turning. Inside the zoom rotating barrel 101, a first lens unit L1 is disposed at the object side, a second lens unit L2 at an intermediate position and a third lens unit L3 at the camera 1 side.

The imaging lens L' is lengthened/shortened as shown in FIG. 5A to FIG. 5C by the zoom rotating barrel 101 being turned. FIG. 5A shows a tele position and FIG. 5B shows a wide angle position. Zooming between these positions is implemented by moving the first lens unit L1, the second lens unit L2 and the third lens units L3. The range between FIG. 5A and FIG. 5B is a focusing-possible range (a range in which the optical system can be arranged in a focused state). Imaging of objects is possible in this range.

FIG. 5C shows a state in which the first lens unit L1, the second lens unit L2 and the third lens unit L3 are withdrawn further from the imaging-possible positions and the length of the imaging lens L' is shortened to a minimum. In this state, the object light cannot be focused on the imaging surface 51a of the imaging element 51. That is, the range between FIG. 5C and FIG. 5B is a focusing-non-possible range (a range in which the optical system cannot be arranged in a focused state). Positions in this range are states that are unsuitable for imaging, in which the object light cannot be focused on the imaging surface 51a of the imaging element 51. This shortening of the imaging lens L' may be performed manually by a photographer, and the imaging lens L' may be shortened automatically when, for example, a half-press is performed and a timing period passes.

Figure 6:
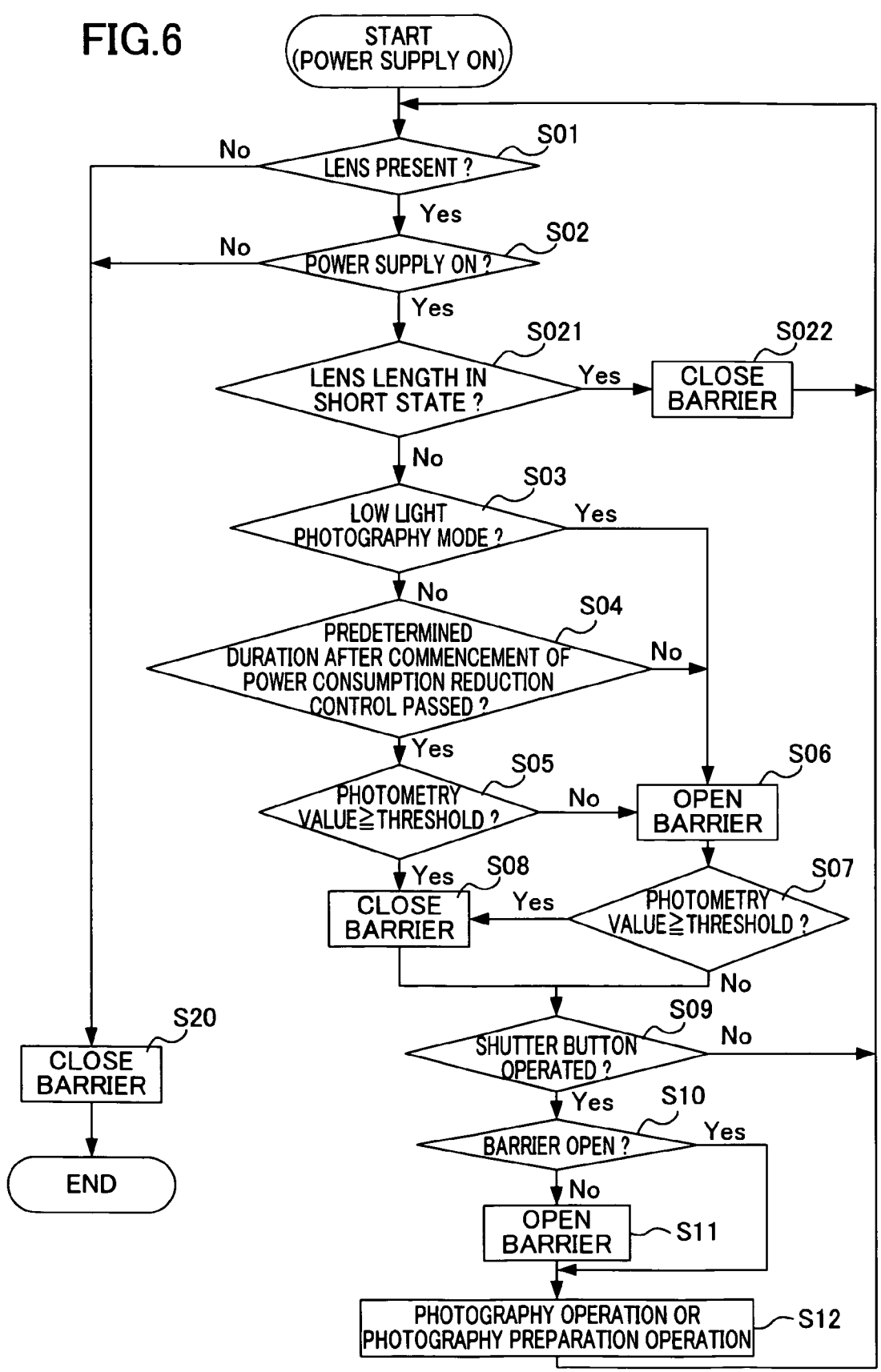
FIG. 6 is a flowchart showing opening/closing control of the barrier, which is implemented by a barrier control section of the second embodiment.

FIG. 6 is a flowchart showing the opening/closing control of the barrier that is implemented by the barrier control section 81 of the second embodiment. The second embodiment differs from the first embodiment in that step S021 and step S022 are included between step S02 and step S03 of the flowchart of the first embodiment which is shown in FIG. 4. The constitution of the camera 1 and other portions of the flowchart are the same as in operations in the flow of the first embodiment (FIG. 4). Portions that are the same are assigned the same reference numerals, and descriptions thereof are not given.

(Step S021: Lens Group Position Judgment)

It is judged whether the first lens unit L1, the second lens unit L2 and the third lens unit L3 can be disposed to be capable of focusing (i.e., whether or not the lens length is in the shortened state). If the lens length is not shortened and the first lens unit L1, the second lens unit L2 and the third lens unit L3 can be disposed to be capable of focusing (i.e., a 'no' judgment in step S021), the barrier control section 81 proceeds to step S03. If the lens length is shortened (i.e., a 'yes' judgment in step S021), the barrier control section 81 proceeds to step S022.

(Step S022: Barrier Member Closed Position Control)

If the lens length is in the shortened state (the 'yes' judgment in step S021), the barrier control section 81 controls to drive the barrier 71 to the closed position, in order to prevent ingression of dust into the interior of the casing 10 and incidence of strong light on the imaging element, and the processing ends.

According to the second embodiment of the camera 1 hereabove, in addition to the effects of the first embodiment of the camera 1, the following effect is featured. When the imaging lens units L1, L2 and L3 cannot focus, even if imaging can be performed, the camera 1 cannot obtain a focused image. Therefore, the likelihood of imaging being performed is low. In this case, there is no impediment to the barrier 71 being driven to the closed position, and by the barrier 71 being closed, ingression of dust into the interior of the casing 10 can be prevented and the imaging element 51 can be protected from external light.

Third Embodiment

Figure 7:
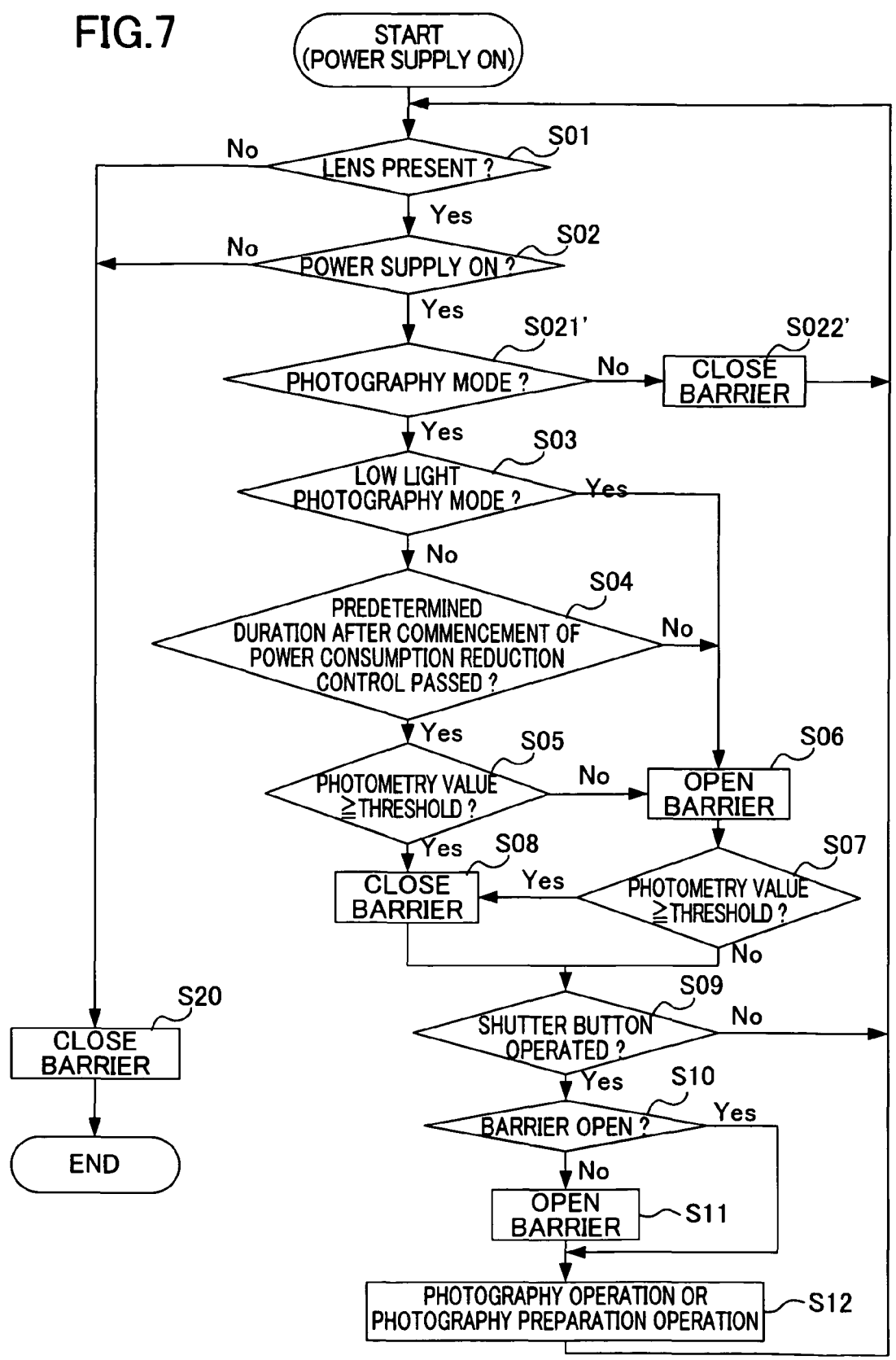
FIG. 7 is a flowchart showing opening/closing control of the barrier, which is implemented by a barrier control section of a third embodiment.

FIG. 7 is a flowchart showing the opening/closing control of the barrier 71 that is implemented by the barrier control section 81 of the third embodiment. The third embodiment differs from the first embodiment in that the camera 1 can be set to any mode of imaging modes that carry out imaging and non-imaging modes that carry out operations other than imaging, and in that step S021' and step S022' are included between step S02 and step S03 of the flowchart of the first embodiment which is shown in FIG. 4. The constitution of the camera 1 and other portions of the flowchart are the same as in the first embodiment. Portions that are the same are not described.

(Step S021': Lens Group Position Judgment)

The camera 1 judges whether it is in an imaging mode. Cases of not being in an imaging mode, which is to say cases of being in a non-imaging mode (judged as 'no' in step S021'), are, for example, cases of being in a replay mode in which images photographed and recorded in the memory F are replayed, a setting mode in which imaging conditions are specified, a processing mode in which images recorded in the memory F are processed, and the like. In the case of a non-imaging mode, the barrier control section 81 proceeds to step S022', and in the case of an imaging mode (judged as 'yes' in step S021'), the barrier control section 81 proceeds to step S03.

(Step S022': Barrier Member Closed Position Control)

If it is judged that the camera 1 is in a non-imaging mode (the 'no' judgment in step S021'), the barrier control section 81 controls to drive the barrier 71 to the closed position, and the processing ends.

According to the third embodiment of the camera 1 hereabove, in addition to the effects of the first embodiment of the camera 1, the following effect is featured. When in a non-imaging mode, the camera 1 drives the barrier 71 to the closed position. Because imaging is not performed when in a non-imaging mode, there is no impediment to the barrier 71 being driven to the closed position, and when the barrier 71 is closed, there is an effect in that both ingression of dust into the interior of the casing 10 can be prevented and the imaging element 51 can be protected from external light.

Fourth Embodiment

Figure 8:
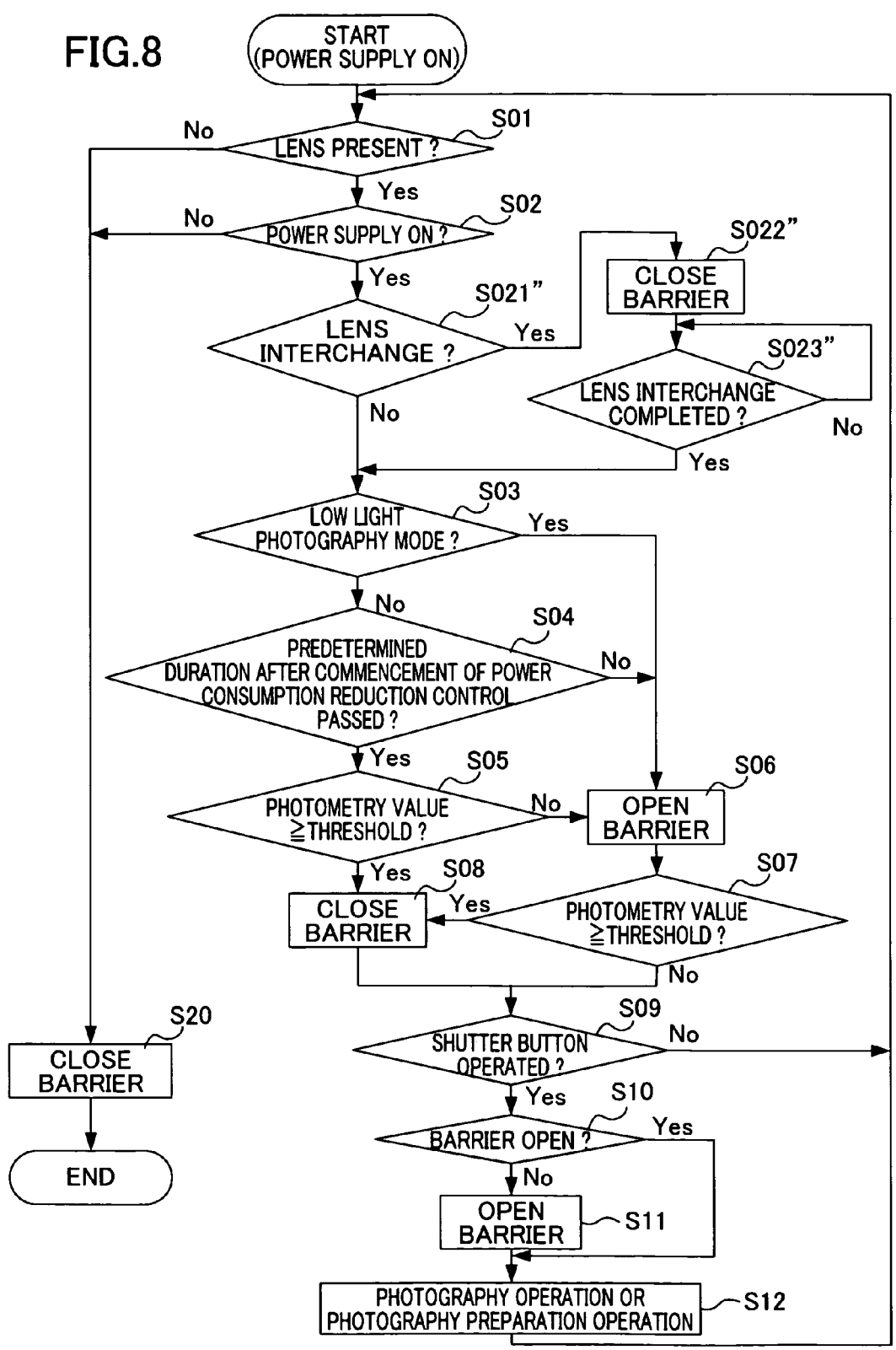
FIG. 8 is a flowchart showing opening/closing control of the barrier, which is implemented by a barrier control section of a fourth embodiment.

FIG. 8 is a flowchart showing the opening/closing control of the barrier apparatus 70 that is implemented by the barrier control section 81 of the fourth embodiment. The fourth embodiment differs from the first embodiment in that step S021", step S022" and step S023" are included between step S02 and step S03 of the flowchart of the first embodiment which is shown in FIG. 4. The constitution of the camera 1 and other portions of the flowchart are the same as in the first embodiment. Portions that are the same are not described.

(Step S021": Lens Interchange Judgment)

The camera 1 judges whether an interchange of the imaging lens L is being carried out. The judgment is carried out in accordance with pressing of a push-button switch for lens detachment. If an interchange of the imaging lens L is not being performed (a 'no' judgment in step S021"), the barrier control section 81 proceeds to step S03. If an interchange of the imaging lens L is being performed (a 'yes' judgment in step S021"), the barrier control section 81 proceeds to step S022".

(Step S022": Barrier Member Closed Position Control)

When the barrier control section 81 judges that a lens interchange of the imaging lens L is being carried out (the 'yes' judgment in step S021"), the barrier control section 81 closes the barrier 71 and proceeds to step S023".

(Step S023": Barrier Member Open Position Control)

When the barrier control section 81 detects that a imaging lens L is mounted, the barrier control section 81 judges that the interchange of the imaging lens L is complete (a 'yes' judgment in step S023"), and proceeds to step S03.

According to the fourth embodiment of the camera 1 hereabove, in addition to the effects of the first embodiment of the camera 1, the following effect is featured. If an interchange of the imaging lens L is being carried out, the camera 1 drives the barrier 71 to the closed position. During an interchange of the imaging lens L, the interior of the casing 10 is exposed to the exterior, and consequently the possibility of ingression of dust is relatively high. However, according to the present embodiment, because the barrier 71 is closed at this time, there is an effect in that both the possibility of ingression of dust can be lowered and the imaging element 51 can be protected from external light.

Hereabove, according to the above-described embodiments, even in the state in which an interchangeable lens is mounted at the camera, when the camera or camera system (camera and lens) switches from an imaging state or an imaging standby state to a non-imaging state (a short lens state, an image replay mode state or a menu screen state), a structure is formed, by the mount barrier being closed, that prevents ingression of foreign matter and the like into the camera. Now, in a state in which a lens barrel is mounted to the camera, when a lens moves within the lens barrel, currents are generated in air that is between the lens barrel and the camera body, and it is possible that these air currents will cause foreign matter to ingress into the camera interior. In the embodiments described above, when the camera system switches into a non-imaging state, the lenses may be moved to, for example, a reset position or the like (even at times other than tube-shortening when the lenses are moved). Therefore, in the above-described embodiments, the barrier is closed not just to protect the imaging element from strong light but also in order to prevent foreign matter ingressing into the camera due to such lens movements.

Fifth Embodiment

Next, a fifth embodiment of the camera is described. In this fifth embodiment, portions that realize the same functions as in the earlier-described first embodiment are assigned the same reference numerals, or reference numerals with common suffixes, and duplicative descriptions and drawings are suitably omitted.

Figure 9:
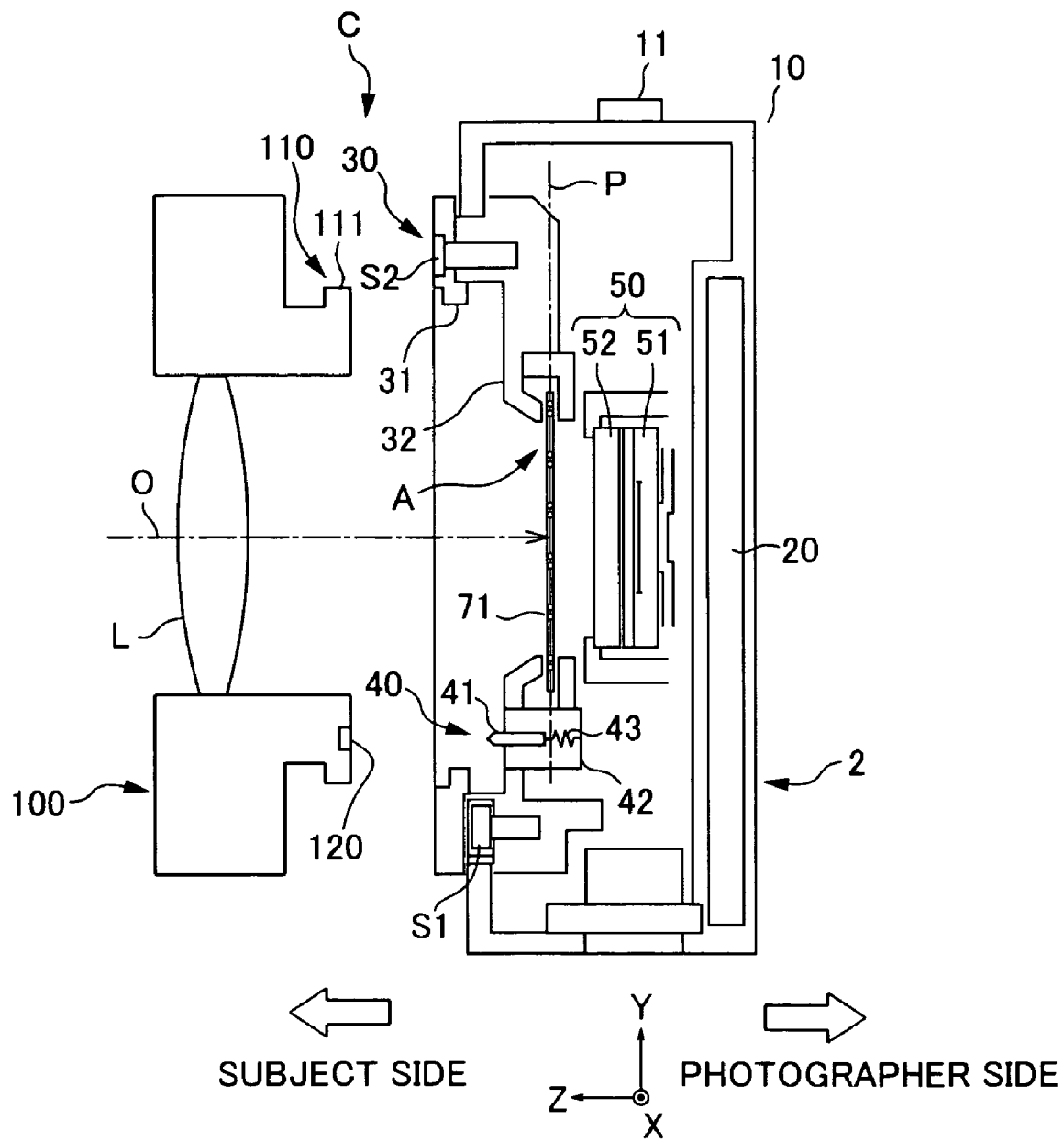
FIG. 9 is a sectional diagram showing the constitution of a camera of a fifth embodiment.

FIG. 9 is a sectional diagram showing the constitution of the fifth embodiment of the camera, and shows the state in which the barrier is at the closed position.

A camera 3 of this fifth embodiment differs from the camera 1 of the first embodiment in that the dust removal apparatus 60 is not provided. Therefore, the barrier 71 opposes the LPF 52 provided at the imaging unit 50 when at the closed position. Thus, no other members are disposed between the barrier 71 and the LPF 52.

In the camera 3 of the fifth embodiment, because the barrier 71 and the imaging unit 50 oppose one another and no other members are disposed therebetween, compared to the camera 1 of the first embodiment, the optical axis O direction dimension (the thickness of the camera) is made even smaller, and a reduction in thickness and a reduction in size may be realized.

Variant Embodiments

The present invention is not limited to the embodiments described hereabove; various modifications and alterations are possible as illustrated below, and these fall within the scope of equivalents of the present invention.

(1) The camera of the embodiments detects the mounting state of the interchangeable lens via the electrical contacts, but this is not limiting. The mounting state of the interchangeable lens may be detected by a mechanical switch.

(2) The camera of the embodiments performs control and drives the barrier to the closed position after a predetermined duration has passed since the power consumption reduction control being commenced, but this is not limiting. The barrier may be driven to the closed position at the same time as commencement of the power consumption reduction control.

(3) The embodiments perform photometry using the imaging element based on object light that passes through the imaging lens (TTL photometry), but this is not limiting. For example, a photometry sensor may be provided at the casing, photometry performed by this photometry sensor, and opening/closing control of the barrier performed on the basis of photometry results therefrom. In this case, as well as closing control of the barrier, opening control of the barrier may be performed on the basis of photometry values.

(4) The camera of the embodiments performs control to slow the driving speed of the barrier when the quiet mode or the quiet imaging mode is selected. However, conditions for varying the driving speed of the barrier are not limited thus. For example, at step S07 of the flowchart shown in FIG. 4, if a full-press operation of the release button (i.e., an imaging command) is detected, the driving speed of the barrier may be made faster than usual and the barrier may be quickly withdrawn from the light path, so as to switch into imaging operations rapidly.

(5) The camera may be constituted to enable opening and closing of the barrier being performed by manual operation of a predetermined operation switch. In this case, the barrier may be driven to the open position even when an interchangeable lens is not mounted, and the vibration filter of the dust removal apparatus may be cleaned. Further, if the camera is not provided with a dust removal apparatus, the optical low pass filter may be cleaned and dust adhering to the optical low pass filter removed.

(6) If a lens cap sensor is provided at the imaging lens in the above embodiments, and it is judged that the lens cap is attached, then even if the various conditions of the above embodiments are applicable, the barrier need not be closed. This is because, when the lens cap is attached, light is not incident on the imaging element and therefore the imaging element is protected. Note that the above-mentioned various conditions do not include the lens interchange of the fourth embodiment. This is because, at the time of lens interchange, the imaging surface 51a is exposed to external light regardless of the presence or absence of the lens cap.

(7) The body side electrical contact points of the embodiments are disposed below the aperture portion but this is not limiting, provided they avoid a range of movement at times of opening/closing operations of the barrier member in the state in which the interchangeable lens barrel is mounted (i.e., they are at a position that allows opening/closing operations of the barrier). For example, they may be disposed upward or sideward of the aperture portion.

(8) In the embodiments, the contact support portion that supports the body side electrical contact points is fixed to the aperture definition portion that defines the aperture portion of the body side mount, but this is not limiting. The contact support portion may be fixed to another member (for example, the casing or the like).

(9) The shape of the barrier member provided in the camera is not limited to the shape described in the embodiments and may be suitably modified. The barrier member of the embodiments is provided with a disk-form barrier body portion but, for example, the barrier member may have a structure that is provided with two semi-circular plate members and arm portions provided at each of these plate members. In this case, the aperture portion is closed off in the same manner as in the embodiments by the semi-circular plate members being touched together and forming a circle, and object light is allowed to pass by the semi-circular plate members being moved apart. Further, the barrier member may have a structure that is formed by a plural number of rectangular plate members, with these plate members being caused to run in, for example, the vertical direction (Y-axis direction) or width direction (X-axis direction) of the camera.

(10) The imaging unit provided in the camera of the embodiments is provided with the imaging element and the optical low pass filter, but the structure of the imaging unit is not limited thus. For example, it may have a structure that is not provided with the optical low pass filter. In this case, the thickness of the camera may be further reduced.

What is claimed is:

1. A camera comprising:
   a connection portion that is detachably connected with an interchangeable lens and is provided with an aperture portion, the aperture portion allowing object light that advances through the interchangeable lens to pass therethrough;
   an imaging element that performs imaging of the object light;
   a barrier member that is provided to be movable, in a state in which the interchangeable lens is connected with the connection portion, between a closed position, at which the barrier member substantially closes off the aperture portion of the connection portion, and an open position, at which the barrier member is withdrawn from a light path of the object light, the barrier member being provided to be always movable between the closed position and the open position, in a disposed location between the interchangeable lens and the imaging element in an optical axis direction of the object light, in a state in which the interchangeable lens is connected with the connection portion; and
   a barrier control section that judges a state of mounting of the interchangeable lens to the connection portion, controls the barrier member be in to the closed position if the interchangeable lens is not mounted, and controls the barrier member to be in the open position if the interchangeable lens is mounted and a predetermined first condition is satisfied.

2. The camera according to claim 1, wherein
   the barrier control section judges that the first condition is not satisfied if a power supply of the camera is in an off state, and judges that the first condition is satisfied if the power supply is in an on state and at least one of predetermined second conditions is satisfied.

3. The camera according to claim 2, further comprising
   a power supply control section that, under a defined condition, implements power consumption reduction control which suspends supplies of electrical power to at least a portion of electrical members provided in the camera,
   wherein the barrier control section judges that the second condition is satisfied if the power supply control section is not performing the power consumption reduction control.

4. The camera according to claim 3, wherein,
   even if the power supply control section has commenced the power consumption reduction control, the barrier control section considers the second condition to be satisfied until a predetermined duration has passed since the power consumption reduction control has commenced.

5. The camera according to claim 2, further comprising
   a photometry section that measures a brightness of an object field,
   wherein the barrier control section judges that the second condition is satisfied if a photometry value provided by the photometry section is less than a predetermined threshold value.

6. The camera according to claim 5 wherein,
   if the photometry value is at least the threshold value, the barrier control section controls to close the barrier member regardless of whether or not the second condition is satisfied.

7. The camera according to claim 2, wherein
   the camera is provided with a dark light exposure control mode that performs automatic exposure control appropriate to imaging in a dark place as an automatic exposure control mode and
   the barrier control section judges that the second condition is satisfied if the dark light exposure control mode is selected.

8. The camera according to claim 1, wherein
   the barrier control section variably controls a movement speed of the barrier member in accordance with a condition.

9. The camera according to claim 8, wherein
   the camera is provided with a quiet mode that reduces operation sounds and,
   when the quiet mode is selected, the barrier control section performs control to make a driving speed of the barrier member slower than when another mode is selected.

10. The camera according to claim 1, wherein
    the barrier control section controls the barrier member to the closed position if the interchangeable lens is mounted and the first condition is not satisfied.

11. The camera according to claim 1, wherein
    the interchangeable lens is provided with a plurality of lens units and is capable of being either in a first state, in which the plurality of lens units can be disposed to be capable of focusing an image at an imaging surface of the camera, or a second state, in which a lens length is shorter than in the first state and the plurality of lens units cannot be disposed to be capable of focusing the image at the lens imaging surface, and the barrier control section controls the barrier member to the closed position if the interchangeable lens is in the second state.

12. The camera according to claim 1, wherein the camera can be set to any of an imaging mode, which performs imaging, and a non-imaging mode, which performs an operation other than imaging, and the barrier control section controls the barrier member to the closed position if the camera is in the non-imaging mode.

13. The camera according to claim 1, wherein the barrier control section controls the barrier member to the closed position if an interchange operation of the interchangeable lens is being performed.

14. The camera according to claim 1, wherein the barrier member is provided to be movable, between the closed position that substantially closes off the aperture portion and the open position that is withdrawn from the light path of the object light, within a plane substantially perpendicular to an optical axis of the object light passing through the aperture portion, and the camera is provided with:

a body side electrical contact point that is provided to be capable, in the state in which the interchangeable lens is connected with the connection portion, of contact with a lens side electrical contact point provided at the interchangeable lens; and a contact support portion which is a member that supports the body side electrical contact point, and at least a portion of the contact support portion, in the optical axis direction, overlapped with the plane substantially perpendicular to the optical axis that defines movement of the barrier member.

15. The camera according to claim 14, wherein the contact support portion is disposed at a position that avoids a range of movement when the barrier member moves between the closed position and the open position.

16. The camera according to claim 14, further comprising an imaging unit that includes an imaging element which converts the signal light to electronic signals, wherein the barrier member, at the closed position, is disposed to oppose an incidence face of the imaging unit, and in the state of opposition of the barrier member at the closed position and the imaging unit, no other member is disposed between the barrier member and the imaging unit.

17. The camera according to claim 16, wherein the imaging unit is provided with an optical filter that is disposed to oppose an imaging surface of the imaging element, and the barrier member, at the closed position, is disposed to oppose the optical filter.

18. The camera according to claim 14, further comprising:

an imaging unit that includes an imaging element, which converts signal light that has passed through the interchangeable lens to electronic signals, and a light-transmissive member capable of vibrating, which is disposed at an incidence face side of the imaging unit, wherein the barrier member, at the closed position, is disposed to oppose the light-transmissive member, and in the state of opposition of the barrier member at the closed position and the light-transmissive member, no other member is disposed between the barrier member and the light-transmissive member.

19. A camera comprising:

a connection portion that is detachably connected with an interchangeable lens and is provided with an aperture portion, the aperture portion allowing object light that advances through the interchangeable lens to pass therethrough;

a barrier member that is provided to be movable, within a plane substantially perpendicular to an optical axis of the object light passing through the aperture portion, between a closed position, at which the barrier member substantially closes off the aperture portion, and an open position, at which the barrier member is withdrawn from a light path of the object light, the barrier member being provided to be always movable between the closed position and the open position, in a disposed location between the interchangeable lens and the imaging element in an optical axis direction of the object light, in the state in which the interchangeable lens is connected with the connection portion;

a body side electrical contact point that is provided to be capable, in the state in which the interchangeable lens is connected with the connection portion, of contact with a lens side electrical contact point provided at the interchangeable lens; and a contact support portion which is a member that supports the body side electrical contact point, and at least a portion of the contact support portion, in the optical axis direction, overlapped with the plane substantially perpendicular to the optical axis that defines movement of the barrier member.

20. The camera according to claim 19, wherein the contact support portion is disposed at a position that avoids a range of movement when the barrier member moves between the closed position and the open position.

21. The camera according to claim 13, wherein the barrier control section controls the barrier member to be maintained in the closed position during a period from detecting start of a detaching operation of the interchangeable lens until detecting completion of attaching the interchangeable lens.

22. The camera according to claim 19, wherein the barrier member is maintained in the open position which the camera is performing an imaging preparation operation and an imaging operation.

* * * * *